(12) United States Patent
Lechner et al.

(10) Patent No.: US 9,890,889 B2
(45) Date of Patent: *Feb. 13, 2018

(54) LINE CONNECTOR AND READY-MADE MEDIA LINE

(75) Inventors: Martin Lechner, Lindlar (DE); Olav Borgmeier, Hückeswagen (DE); Otfried Schwarzkopf, Kürten (DE); Andreas Linnepe, Lüdenscheid (DE); Reiner Mitterer, Wipperfürth (DE); Sascha Rosenfeldt, Dortmund (DE); Josef Brandt, Wipperfürth (DE)

(73) Assignee: VOSS Automotive GmbH, Wipperfurth (DE)

( * ) Notice: Subject to any disclaimer, the term of this patent is extended or adjusted under 35 U.S.C. 154(b) by 417 days.

This patent is subject to a terminal disclaimer.

(21) Appl. No.: 12/808,588

(22) PCT Filed: Dec. 10, 2008

(86) PCT No.: PCT/EP2008/067159
§ 371 (c)(1),
(2), (4) Date: Sep. 13, 2010

(87) PCT Pub. No.: WO2009/080501
PCT Pub. Date: Jul. 2, 2009

(65) Prior Publication Data
US 2011/0006513 A1    Jan. 13, 2011

(30) Foreign Application Priority Data

Dec. 21, 2007  (DE) .................... 20 2007 018 086 U
Apr. 9, 2008   (DE) .................... 20 2008 004 954 U (51) Int. Cl.
*F16L 53/00*    (2006.01)
*F16L 25/01*    (2006.01)
*H05B 3/42*     (2006.01)

(52) U.S. Cl.
CPC .............. *F16L 53/008* (2013.01); *F16L 25/01* (2013.01); *H05B 3/42* (2013.01); *F01N 2240/16* (2013.01);
(Continued)

(58) Field of Classification Search
CPC ........... F16L 53/008; F16L 25/01; H05B 3/42
(Continued)

(56) References Cited

U.S. PATENT DOCUMENTS 1,809,714 A * 6/1931 Mathews .............. F16L 53/008
                                                219/522
2,723,108 A * 11/1955 Butler ...................... C01D 1/04
                                                 137/74
(Continued)

FOREIGN PATENT DOCUMENTS

CA    2 008 633 A1    7/1990
DE    2749098 A1      5/1978
(Continued)

OTHER PUBLICATIONS

International Search Report of PCT/EP2008/067159 dated Apr. 3, 2009, 4 pages.

*Primary Examiner* — James M Hewitt, II
(74) *Attorney, Agent, or Firm* — Eric J. Sosenko; Jonathan P. O'Brien; Honigman Miller Schwartz and Cohn LLP (57) ABSTRACT

A line connector for media lines including a fluid connector having at least one connection section for terminal connection to a fluid line and having a transition section with an inner fluid channel adjoining the connection section. An electric heating element is provided at least in certain areas. The fluid connector is encased by encapsulation at least in the region of the heating element. The encapsulation has a branch for an electric supply conductor for the heating
(Continued)

element. A ready-made media line includes the above mentioned line connector and an attached fluid line.

10 Claims, 9 Drawing Sheets (52) U.S. Cl.
CPC ...... *F01N 2610/02* (2013.01); *F01N 2610/10* (2013.01); *F01N 2610/14* (2013.01)

(58) Field of Classification Search
USPC ............... 285/41, 122.1, 125.1, 132.1, 187; 138/33; 392/468, 478, 479, 480, 482; 137/341; 439/193; 219/535
See application file for complete search history.

(56) References Cited

U.S. PATENT DOCUMENTS

| | | | | |
|---|---|---|---|---|
| 2,793,280 | A * | 5/1957 | Harvey | F16L 53/008 137/341 |
| 3,378,673 | A * | 4/1968 | Hopper | 392/472 |
| 3,789,188 | A * | 1/1974 | Rudbarg | 392/468 |
| 3,932,727 | A | 1/1976 | True | |
| 3,968,346 | A * | 7/1976 | Cooksley | 392/491 |
| 3,986,732 | A | 10/1976 | Stanley | |
| 4,161,647 | A * | 7/1979 | Carbonnel | 392/473 |
| 4,213,433 | A * | 7/1980 | Day | 123/549 |
| 4,435,005 | A | 3/1984 | Berger et al. | |
| 4,455,474 | A * | 6/1984 | Jameson et al. | 392/472 |
| 4,553,023 | A * | 11/1985 | Jameson | F16L 53/008 137/341 |
| 4,686,354 | A * | 8/1987 | Makin | 392/472 |
| 4,815,769 | A | 3/1989 | Hopperdietzel | |
| 4,993,607 | A * | 2/1991 | Brun | B22D 41/50 106/38.9 |
| 4,995,644 | A * | 2/1991 | Brown et al. | 285/41 |
| 5,239,615 | A * | 8/1993 | Moore et al. | 392/441 |
| 5,544,275 | A | 8/1996 | Ebbing et al. | |
| 6,617,556 | B1 | 9/2003 | Wedel | |
| 7,449,661 | B1 * | 11/2008 | Bench | B64F 1/305 219/201 |
| 8,022,339 | B2 * | 9/2011 | Schlipf | 219/535 |
| 2003/0034648 | A1 | 2/2003 | Zitkowic et al. | |
| 2005/0083638 | A1 | 4/2005 | Warren et al. | |
| 2007/0176418 | A1 | 8/2007 | Frogneborn et al. | |
| 2007/0257026 | A1 | 11/2007 | Tanaka et al. | |
| 2010/0263740 | A1 * | 10/2010 | Borgmeier et al. | 137/341 |

FOREIGN PATENT DOCUMENTS

| | | | | |
|---|---|---|---|---|
| DE | 2752374 | A1 | 5/1979 | |
| DE | 19930736 | U1 | 7/1993 | |
| DE | 19510193 | A1 | 9/1996 | |
| DE | 29807763 | U1 | 9/1999 | |
| DE | 19818649 | A1 | 10/1999 | |
| DE | 2001792 | U1 | 2/2002 | |
| DE | 20115436 | U1 | 2/2003 | |
| DE | 20214847 | U1 | 2/2004 | |
| DE | 103 26 894 | B3 | 9/2004 | |
| DE | 20 2005 004 602 | | 7/2005 | |
| DE | 20 2006 003 590 | | 6/2006 | |
| DE | 20200501369 | U1 | 1/2007 | |
| DE | 102006034697 | A1 | 2/2007 | |
| EP | 0219126 | A2 | 4/1987 | |
| EP | 0 379 635 | A | 8/1990 | |
| EP | 0 764 810 | | 3/1997 | |
| EP | 1513227 | A1 * | 3/2005 | F16L 25/01 |
| EP | 1 610 049 | A | 12/2005 | |
| EP | 1 698 769 | A2 | 9/2006 | |
| EP | 1 710 484 | | 10/2006 | |
| EP | 1 777 452 | A | 4/2007 | |
| EP | 1553270 | | 7/2007 | |
| EP | 1 818 588 | A1 | 8/2007 | |
| EP | 1985908 | A1 * | 10/2008 | F16L 53/00 |
| FR | 1 065 308 | | 5/1954 | |
| GB | 2 423 686 | A | 2/2002 | |
| JP | 08152082 | | 6/1996 | |
| JP | 10306889 | | 11/1998 | |
| JP | 2000065266 | | 3/2000 | |
| JP | 2000266261 | | 9/2000 | |
| WO | 20030021087 | A1 | 3/2003 | |
| WO | WO 2005/001322 | A1 | 1/2005 | |
| WO | WO 2005/124219 | A1 | 12/2005 | |
| WO | WO 2007/032034 | A1 | 3/2007 | |
| WO | WO 2007/073286 | A1 | 6/2007 | |
| WO | WO 2009/013342 | A2 | 1/2009 | |

* cited by examiner

LINE CONNECTOR AND READY-MADE MEDIA LINE

CROSS REFERENCE TO RELATED APPLICATIONS

This application claims priority to German Patent Application No. 20 2007 018 086.1, filed Dec. 21, 2007, German Patent Application No. 20 2008 004 954.7, filed Apr. 9, 2008, and PCT patent application PCT/EP2008/067159 filed Dec. 10, 2008.

FIELD OF THE INVENTION

The present invention relates to a line connector for media lines, composed of a fluid connector having at least one attachment section for attachment connection to a fluid line or assembly, and having a transition section which adjoins the attachment section and has an inner fluid duct, with electrical heating means being provided at least in regions.

The invention also relates to an assembled media line using at least one such line connector.

BACKGROUND AND SUMMARY OF THE INVENTION

Line connectors of above mentioned type serve for connecting at least two media lines to one another or for the attachment connection of at least one line to an arbitrary assembly. Here, line connectors and media lines of said type can be used in particular in motor vehicles for media which, on account of their freezing point, tend to freeze even at relatively high ambient temperatures. This can cause certain functions to be adversely affected. This is the case for example with water lines for the windshield washer system, and above all also with lines for an aqueous urea solution which is used as a $NO_x$ reduction additive for diesel engines with so-called SCR catalytic converters. It is therefore possible at low temperatures for electrical heating means to be activated in order to prevent freezing or to unfreeze the already-frozen medium.

A line connector of the stated type is described in WO 2007/073286 A1. Here, an electrical heating device is fastened to the outside of the fluid connector by means of a clip element. In a transition region between the fluid connector, which is designed as a plug part of a fluid plug connection, and the fluid line, a sleeve-shaped transition piece is provided so as to adjoin the region of the heating device, which sleeve-shaped transition piece is arranged between the fluid connector and one end of a protective tube which surrounds the fluid line. The heating device is therefore exposed and unprotected in the outer region of the fluid connector. Formed between the line, which is likewise equipped with electrical heating means, and the transition piece is a hollow chamber which also serves to hold electrical connections of the heating means. The connections are accommodated only loosely in said hollow chamber, and they are therefore protected only to an insufficient extent against mechanical and other loading. As a result of the loose, undefined arrangement, the electrical connections could come into contact with one another and possibly cause a short circuit. Furthermore, the production and assembly of the known media line is difficult.

The present invention is based on the object of creating a line connector of the stated type which, while being simple to produce in a reliable process, ensures good and permanently reliable performance characteristics. It is also sought to provide an assembled line for the same purpose.

According to the invention, the benefits are achieved firstly by means of a casing which surrounds the fluid connector at least in the region of the heating means, with the casing having a tubular branch for electrical supply cables for the heating means. In this way, the heating means of the fluid connector, which heating means preferably at least partially surround the fluid duct and are formed in particular by at least one heat conductor which runs over the outer circumference of the fluid connector, are protected effectively from external influences. Furthermore, additional thermal insulation to the outside is also obtained. It is thus possible, by means of an air gap formed within the casing, to obtain a good and uniform temperature distribution. An at least partial encapsulation likewise contributes to thermal insulation. It is also advantageous if the casing is also designed to surround an end region of a fluid line attached to the attachment section and preferably also to surround an end region of a tubular sheathing of the fluid line. Said sheathing is formed in particular by a corrugated tube whose end region is fixed in the casing preferably in a positively locking fashion. All the required electrical connections between the heating means of the fluid connector, external supply cables and preferably provided heating means of the fluid line can be accommodated in a well-protected manner within the casing. Particularly effective protection can be obtained if the electrical connections (contact points, bared points) can be embedded in a plastic molding compound by extrusion coating and/or encapsulation. The external supply cables can then be guided to the outside via the casing branch according to the invention. Here, it is advantageous for the branch to be designed to hold an end region of a tubular cable sheath, which is in particular likewise formed by a corrugated tube, for the supply cables in a positively locking fashion. It may alternatively also be provided that the branch has an electrical connection element, in particular in the form of a plug connection for external supply cables. Here, the connection element is connected within the casing to the heating means of the fluid connector and if appropriate to heating means of the fluid line.

In one advantageous refinement of the invention, the branch is formed as a separate branch part which is or can be connected to the casing. Said design of the branch as a separate branch part advantageously results in different application possibilities. It is thus possible for the casing to fundamentally also be used without a branch. If required, the branch part may be fastened in the region of an opening of the casing. The opening may be prefabricated or else formed by removing a region of the casing. Here, a wall part may be broken out via predetermined breaking points. The branch part is fastened in particular by latching means. The branch part may however also be connected to the casing in a positively locking fashion. In the case of an acute or obtuse branch angle with respect to the line axis, and also in the case of a branch approximately parallel to and offset with respect to the line axis, it is also advantageously possible for the branch part to be able to be mounted in different orientations of its branch axis.

The following description describe further advantageous embodiment features of the invention.

BRIEF DESCRIPTION OF THE DRAWINGS

The invention will be explained in more detail on the basis of some preferred exemplary embodiments illustrated in the drawing, in which:

FIGS. 3 and 4 show different circuit variants of the heating means, wherein FIGS. 3a and 4a show in each case a schematic circuit diagram and FIGS. 3b and 4b show in each case the connector in the region of the electrical connections.

DETAILED DESCRIPTION OF THE INVENTION

In the different figures of the drawing, identical parts are always provided with the same reference symbols.

Figure 12:
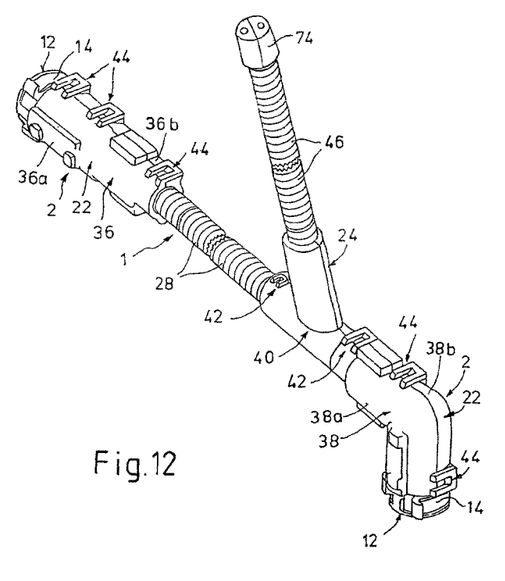
FIG. 12 shows a perspective view of an assembled media line which corresponds in part to the embodiment according to FIG. 8.

FIG. 12 illustrates by way of example an assembled media line 1 which has in each case one line connector 2 according to the invention at each end. Here, each of the two line connectors 2 may optionally be an angle connector (as illustrated by way of example at the right) or a straight connector (as shown for example at the left). This means that fully arbitrary connector geometries are possible at each side. Furthermore, the attachment regions of the connectors may have any desired orientation (for example may also be rotated relative to one another about the line axis).

Figures 1, 2:
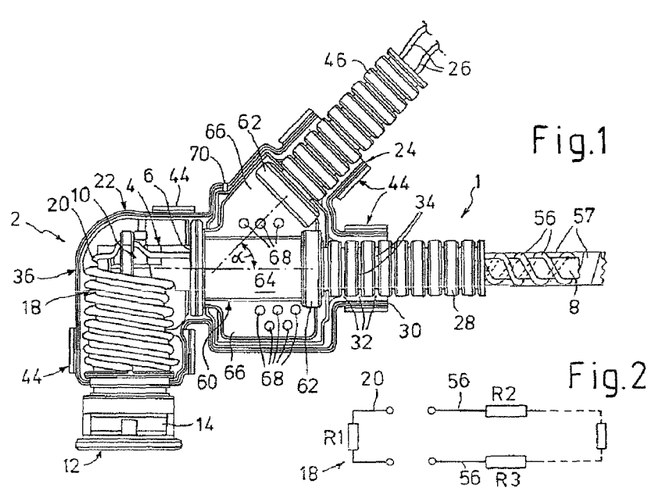
FIG. 1 shows an enlarged side view of a line connector according to the invention with an end region of an attached fluid line, with the casing according to the invention being illustrated open in the form of only one of two housing halves.
FIG. 2 shows a schematic equivalent circuit diagram of electrical heating means of the fluid connector and of the fluid line.
Figure 10:
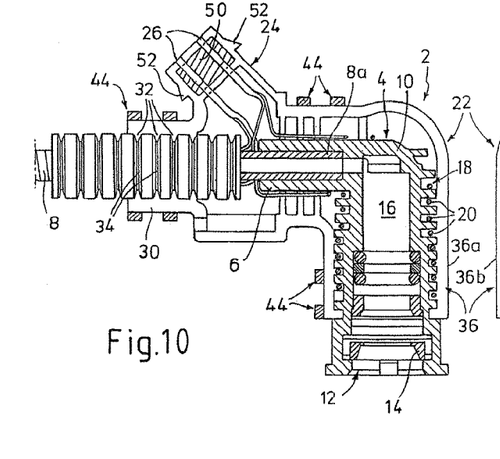
FIG. 10 shows an illustration similar to FIG. 1 in an alternative embodiment.

As can be seen from FIGS. 1 and 10, the line connector 2 according to the invention is composed of a fluid connector 4 having at least one attachment section 6 for connecting to a line end 8a (see FIG. 10) of a fluid line 8. The attachment section 6 is adjoined by a transition section 10 which preferably merges into a second attachment section 12 which is preferably designed as a plug attachment of a fluid plug system. In the illustrated examples, the plug attachment is designed as a pipe coupling for holding a fluid plug (not illustrated). For releasable locking of the plugged-in fluid plug, a radially elastic retaining clamp 14 is arranged in the region of the pipe coupling. As an alternative to said preferred embodiment, the second attachment section 12 may however also be designed as a plug. Furthermore, the fluid connector 4, at the side of the second attachment section 12, may also either be connected directly to any desired assembly or may be designed, similarly to the first attachment section 6, for connecting to a further (second) fluid line.

The first attachment section 6 is preferably designed as a receptacle for the insertion of a line end 8a (see in particular FIGS. 10 and 17), with preferably a non-releasable cohesive connection being provided by means of adhesive bonding, welding or spraying/extrusion coating, in particular by means of laser welding. For this purpose, the fluid connector 4 and the fluid line 8 are composed in each case of a weldable plastic, with the fluid connector 4 being designed to be transparent to laser beams at least in the region of the first attachment section 6. The fluid connector 4 has an inner fluid duct 16.

In regions, specifically in particular at least in the region of the transition section 10, the fluid connector 4 has electrical heating means 18. Said heating means 18 expediently at least partially surround the fluid duct 16 and, for this purpose, are formed by at least one heating conductor 20 which runs over the outer circumference of the fluid connector 4.

According to the invention, the line connector 2 has a casing 22 which surrounds the fluid connector 4 at least in the region of the heating means 18. Said casing 22 itself has a branch 24, in the form of a tube piece, for electrical supply cables 26 for the heating means 18.

In an advantageous embodiment, the casing 22 is also designed to surround an end region of the fluid line 8 attached to the attachment section 6 and preferably to surround an end region of a tubular sheathing 28 of the fluid line 8. The sheathing 28 may advantageously be fixed, in particular in a positively locking fashion, within the casing 22. For this purpose, the casing 22 has a tubular projection 30 with inner circumferential ribs 32 which engage into circumferential channels 34 of the sheathing 20, which is formed in particular by a corrugated tube (parallel-corrugated protective tube, composed in particular of plastic).

In the embodiments according to FIGS. 1, 5 to 7, 10 and 11 and also according to FIGS. 16 to 28, the casing 22 is composed of an outer connector housing 36 which has the branch 24. Said connector housing 36 also has the tubular projection 30 for holding the end region of the sheathing 28 in a positively locking fashion.

Figures 5, 6, 7, 8, 9:
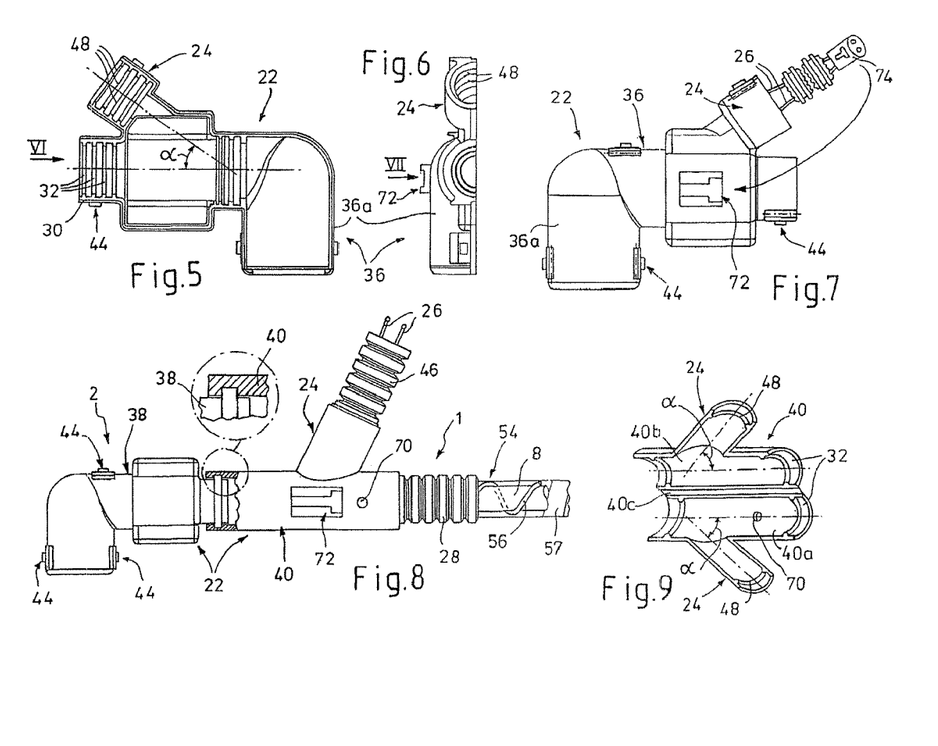
FIG. 5 shows separate view of the inner side of the housing half from FIG. 1.
FIG. 6 shows a view of the housing half in the arrow direction VI according to FIG. 5.
FIG. 7 shows a view of the outside of the housing half in the arrow direction VII according to FIG. 6.
FIG. 8 shows a side view of an alternative embodiment of a casing according to the invention in the form of a multi-part outer housing.
FIG. 9 shows a separate perspective view of a branch housing for the embodiment according to FIG. 8 in the open state.

In the alternative embodiment according to FIGS. 8 and 9 (cf. also the right-hand end region of the perspective illustration in FIG. 12), the casing 22 is composed firstly of a connector housing 38 and secondly of an additional branch housing 40 which has the branch 24. The branch housing 40 is composed of a tubular passage section for the fluid line 8 and of the branch 24 which branches off from the passage section. Here, the passage section is or can be connected at one end directly to the connector housing 38. At the other end, the branch housing 40 is designed to hold the end region of the sheathing 28 of the fluid line 8 in a positively locking fashion. For this purpose, according to FIG. 9, said end region of the branch housing 40 is formed, similarly to the tubular projection 30, with at least one inner circumferential rib 32 for radial engagement into one of the channels 34 of the sheathing 28. For their connection to one another, the connector housing 38 and the branch housing 40 have certain engagement contours (in this regard, see the enlarged detail in FIG. 8), wherein said connection may be one in which said housings are rotatable relative to one another, which has the advantage that the branch 24 may be adjusted with regard to its alignment by rotating the branch housing 40. Alternatively, said connection may be one which is secured against relative rotations, in particular by means of an engagement cross section which differs from the circular shape, for example an oval circumference.

The two-part design according to FIG. 8 has the further advantage that the connector housing 38 may be of any desired design, for example as illustrated for an angle connector or as a straight connector. The branch housing 40 may be used in the same design universally for all different designs of the connector housing 38.

According to FIG. 9, the branch housing 40 is advantageously composed of two housing half shells 40a and 40b which are substantially symmetrical in relation to a parting plane and which can preferably be latched with one another by latching means 42 (cf. FIG. 12). Furthermore, the half shells 40a, 40b may be integrally connected to one another by means of a film hinge 40c, with it being possible for the branch housing 40 to be closed by folding the half shells 40a, 40b together.

The connector housing 36 and 38 is advantageously also composed of two housing half shells a and b which are substantially symmetrical in relation to a parting plane and which can likewise preferably be latched to one another by latching means 44. In the illustrated examples, the housing half shells 36a, b and 38a, b are formed as separate molded parts which are preferably of at least approximately identical design. It may however alternatively also be provided, similarly to FIG. 9, that the connector housing 36 and 38 be formed as a single-piece molded part with its half shells connected to one another in a hinged fashion in particular by means of at least one film hinge (40c).

In the region of their abutting edges which bear against one another in the closed state, the housing half shells may optionally have certain sealing means, such as for example sealing contours (for example in the manner of a tongue and groove connection) or molded-on soft seals (elastomer coating).

In a further advantageous embodiment of the invention, the branch 24 is designed to hold an end region of a tubular cable sheath 46 for the supply cables 26 in a positively locking fashion. Similarly to the sheathing 28, the cable sheath 46 is preferably also a corrugated tube composed of plastic. The branch 24 therefore also has an inner engagement contour with at least one radially inwardly projecting circumferential rib 48 (see also FIGS. 22 to 25).

Figure 11:
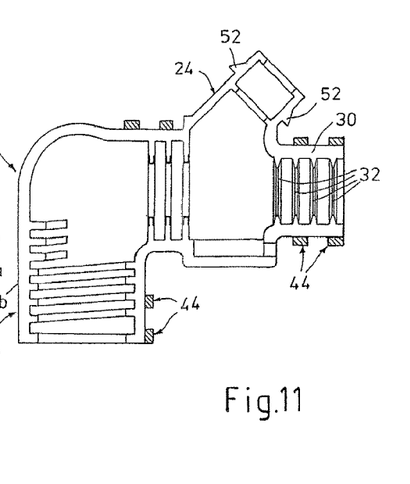
FIG. 11 shows a second housing half for the embodiment according to FIG. 10.

In the embodiment variant according to FIGS. 10 and 11, an electrical connection element 50, in particular in the form of a plug connection, for external supply cables (not illustrated) is fastened in the region of the branch 24. Here, an outer connection plug can be plugged on or in and locked for example by latching means 52. The attachment element 50 is connected within the casing 22 to the heating means 18 of the fluid connector 4 and/or if appropriate to heating means 54 of the attached fluid line 8.

In a preferred embodiment, the fluid line 8 specifically likewise has electrical heating means 54 which are formed in particular by at least one heat conductor 56 which runs in a helical fashion over the circumference of the line. In this regard, reference is made in particular to FIGS. 1 and 8. The heat conductor 56 is preferably closely surrounded, together with the fluid line 8, by a fixing sheath 57 which may be formed for example by an adhesive strip wound helically around the fluid line 8 so as to encompass the heat conductor 56. The heat conductor 56 may be composed of a forward conductor running in a helically wound fashion from one end of the line to the other and of a return conductor running likewise helically or else rectilinearly, as a result of which a good distribution of the heating power is obtained.

The branch 24 may, with regard to its branch axis, enclose practically any desired angle a with an attachment axis of the fluid line 8, though said angle a preferably lies in the range from 20° to 160°. The illustrated examples show an acute-angled Y-shaped branch, though an approximately right-angled T-shaped branch may also be provided (see FIGS. 19 to 21). Furthermore, according to FIG. 28, the branch 24 may also have an axis practically parallel to the attachment axis of the line 8.

The ends of the heat conductors 20, 56 are connected to one another, and/or to the external supply cables 26 via electrical connections 58, in the transition region between the fluid connector 4 and the fluid line 8. With regard to said connections 58, reference is made to the options shown in FIGS. 2 to 4, which will be explained in yet more detail further below.

In an advantageous embodiment, the fluid connector 4 and/or the attached fluid line 8 are/is encased (molded, for example extrusion coated or encapsulated) in regions with a plastic molding compound, in particular with a thermoplastic molded part material based for example on PA, with the encompassment of the electrical connections 58 of the heating means 18, 54. Said molding with plastic takes place in particular in the transition region between the attachment section 6 of the fluid connector 4 and the attached fluid line 8. In this way, an encapsulated structural unit is formed from the fluid connector 4 and the fluid line 8 with their heating means 18, 54, with the required electrical connections 58 being embedded in a molded-on extension part 60 and thereby being protected from mechanical and other influences and also electrically insulated with respect to one another. Here, the extension part 60 with its outer contour and the casing 22 with its inner contour are adapted to one another in such a way that the extension part 60 is accommodated in the casing 22 in a positively locking fashion. According to FIG. 1, the molded-on extension part 60 preferably also surrounds an end of the sheathing 28 of the fluid line 8 and if appropriate also an end of the cable sheath 46 for the supply cables 26. For this purpose, the extension part 60 has molded-on annular collars 62.

The extension part 60 is otherwise composed of an approximately cylindrical base section 64 which surrounds the transition region between the attachment section 6 and fluid line 8. Furthermore, the extension part 60 may have flange-like or vane-like projections 66 situated diametrically opposite one another in a plane, which projections 66 extend from the base section 64. The projections 66 provide effective rotational locking of the extension part 60 within the casing 22 and may also be utilized for accommodating the electrical connections 58 at any desired locations (cf. FIGS. 3b and 4b).

Figures 3, 3B:
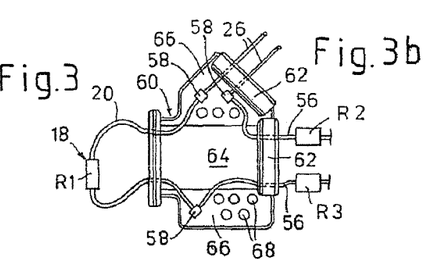
Figure 3A:
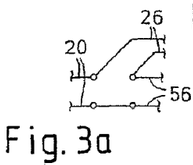
Figures 4, 4B:
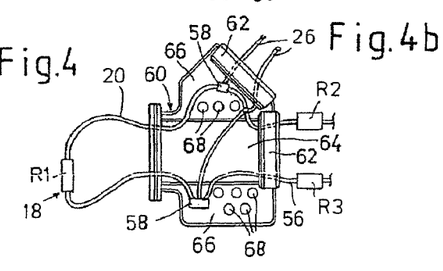

The formation of the extension part 60 takes place in a suitable molding tool. Said tool may for example have pin-shaped positioning elements for the electrical connections 58 in order to position the latter during the molding process such that they are optimally embedded into the plastic. Furthermore, contact between the metallic bared ends of the heat conductors must be prevented. As a result of said positioning projections, holes 68 as in FIGS. 1 and 3b, 4b are formed after the molding process, which holes 68 are however hereinafter of no further significance.

After the assembly of the casing 22, a free space which then remains within the casing 22 is preferably at least partially encapsulated with plastic. For this purpose, the casing may have at least one opening 70 (cf. FIG. 1) for the introduction of a plastic casting compound. Alternatively, an air volume remaining in the free space may also be utilized for heat insulation.

As can also be seen from FIGS. 7 and 8, the casing 22 can have, on the outside in the region of the connector housing 36, 38 and/or in the region of the branch housing 40, at least one holding element 72 for fixedly holding an electrical connection part 74 which is connected to the supply cables 26 (FIG. 7 and also FIG. 12). As illustrated, the holding element 72 may also be designed as a slide-in slot. Said holding element 72 serves for temporarily fixing the connector part 74 during storage and transport until the attachment of the supply cables 26 takes place during assembly. It is then necessary merely for the connector part 74 to be removed from the holding element 72 and connected to a counterpart connector (not illustrated). The connector part 74 may of course also be held in some other suitable way, in particular in a non-positively and/or positively locking fashion or else by means of a hook-and-loop fastener or the like.

At this juncture, different options for the electrical circuitry of the heating means 18, 54 will be explained on the basis of FIGS. 2 to 4. In the equivalent circuit diagram in FIG. 2, the heat conductor 20 is illustrated as electrical resistance R1. The one or more heat conductors 56 of the fluid line 8 are shown as resistances R2 and R3, which are preferably forward and return conductors.

According to FIG. 3, supply cables 26 can be attached to a series connection of the heat conductors 20 and 56. For this purpose, the supply cables 26 are connected at one side to a first end of the heat conductor 20 and at the other side to a first end of the heat conductor 56, while the other two ends of the heat conductors 20, 56 are connected directly to one another.

The circuit shown in FIG. 4 involves a parallel connection of the heat conductors 20 and 56, by virtue of the heat conductors 20 and 56 being connected in each case directly to one another and to one of the supply cables 26.

Figure 13:
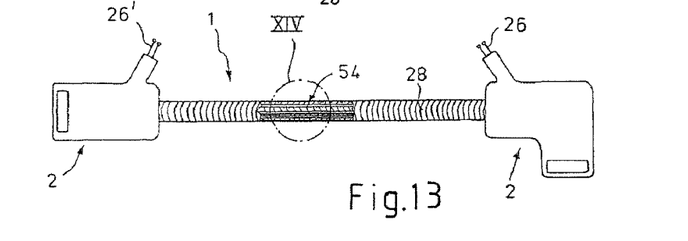
FIG. 13 shows a side view of an assembled media line in a special design, with partially cut-away line sheathing.
Figure 14:
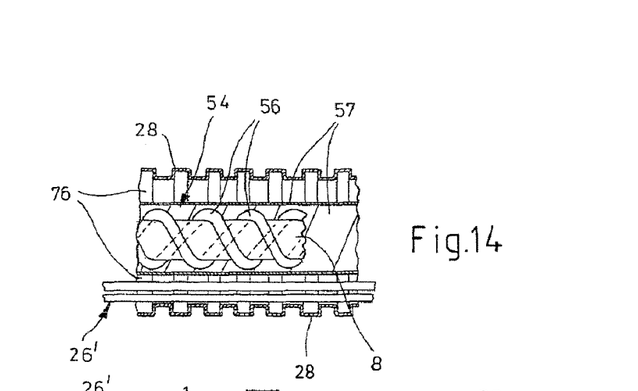
FIG. 14 shows an enlarged detail of the region XIV in FIG. 13.
Figure 15:
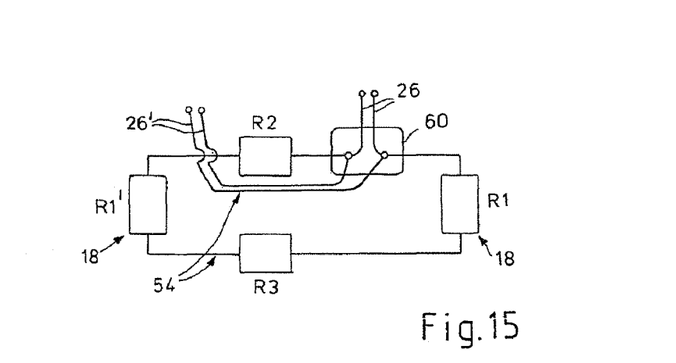
FIG. 15 shows an electrical equivalent circuit diagram for the embodiment according to FIG. 13.

As regards the design of the media line 1 according to FIGS. 13 to 15, said media line 1 is designed practically as a combined fluid and electrical line by virtue of additional electrical cables 26' running within the sheathing 28 on a direct path between the line connectors 2. According to FIG. 14, the cables 26' run preferably in a free space 76 of annular cross section between the fluid line 8, which is preferably surrounded by the heat conductors 56 and preferably the fixing sheath 57, and the sheathing 28. The cables 26' serve to conduct a supply voltage (for example a vehicle on-board voltage) between the line connectors 2 such that the supply voltage can advantageously be supplied or picked off selectively at each of the connectors 2, in particular via their branches 24. In this regard, reference is also made to the circuit diagram in FIG. 15.

In the embodiments according to FIGS. 16 to 28, the branch 24 is a constituent part of a separate branch part 80 which is or can be connected to the casing 22. In this regard, reference is made to the separate illustrations in FIGS. 22 to 25.

The branch part 80 preferably is or can be releasably (separably) connected to the connector housing 36.

Figure 28:
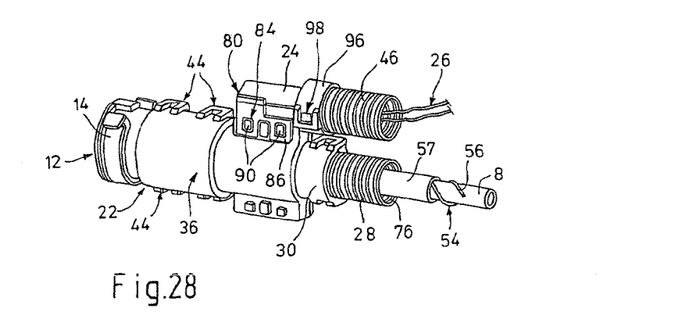
FIG. 28 shows a further embodiment variant in an illustration similar to FIG. 19.

In the embodiments according to FIGS. 16 to 25 and also according to FIG. 28, the branch part 80 is or can be connected by latching means 84 to the connector housing 36 in the region of an opening 82 (shown only in FIG. 17) of said connector housing 36. As can be seen from FIGS. 22 to 25, the branch part 80 has for this purpose an approximately U-shaped connecting section which engages over a region of the connector housing 36, with latching arms 86 engaging with latching openings 88 over latching projections 90 in a positively locking, latching fashion.

Figure 26:
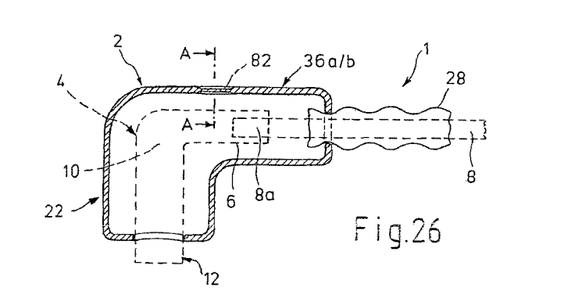
FIG. 26 shows a sketch explaining an alternative embodiment of the line connector in a longitudinal section.
Figure 27:
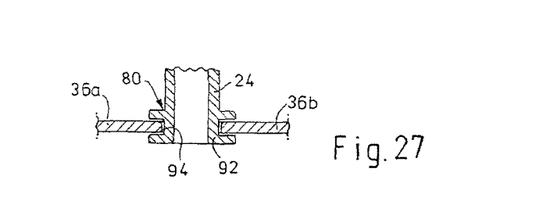
FIG. 27 shows an enlarged partial section in the plane A-A according to FIG. 26 in a state in which the casing is connected to the associated branch part.

In the alternative embodiment according to FIGS. 26 and 27, the branch part 80 has a connecting section 92 with a circumferential groove recess 94, with which the branch part 80, in the region of the opening 82, which is situated in the parting plane of the housing halves 36a, b, of the connector housing 36, is or can be inserted in a positively locking fashion between the housing parts 36a and 36b.

In all the embodiments, the opening 82 of the connector housing 36 may be prefabricated. Preferably, however, the opening 82 can be produced by removing at least one originally present housing region. Said housing regions may be wall sections, which can be broken out via predetermined breaking points, of the housing parts 36a, 36b.

In a further advantageous embodiment, the branch part 80 has, for holding the end region of the tubular cable sheath 46 for the supply cables 26 in a positively locking fashion, a tube-piece-shaped holding section 96 for the cable sheath 46. As can be seen in particular from FIGS. 22 to 25, the holding section 96 is composed of diametrically split halves 96a, 96b, with it being possible for one half 96a to be connected, in particular latched, to the other half 96b so as to encompass the end of the cable sheath 46. For this purpose, latching means 98 are provided similarly to the latching means 44. The halves 96a, 96b may be integrally connected to one another by means of a film hinge 100 in a pivotable and thereby closable fashion. The holding section 96 has, in its interior, an engagement contour with at least one radially inwardly projecting circumferential rib 32 which engages into a channel of the corrugated tube which forms the cable sheath 46.

Figures 16, 17:
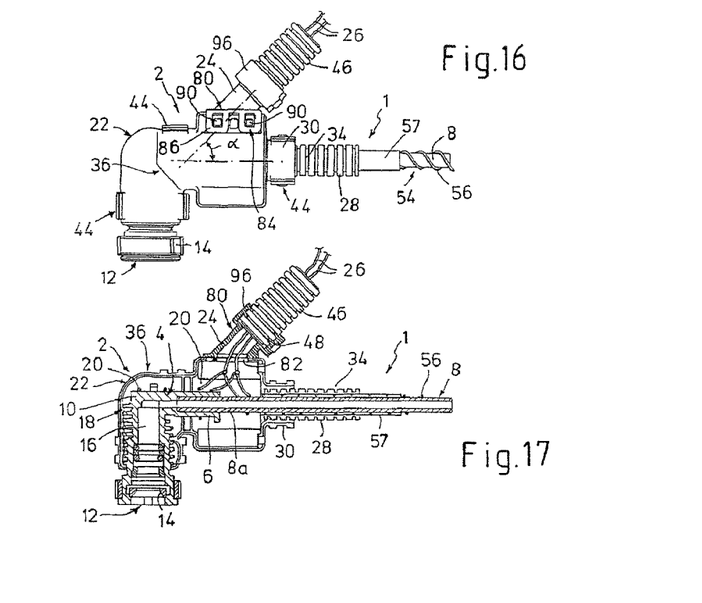
FIG. 16 shows a side view of a special design of the line connector according to the invention having a separate, latched-on branch part.
FIG. 17 shows a longitudinal section of the line connector according to FIG. 16.
Figure 18:
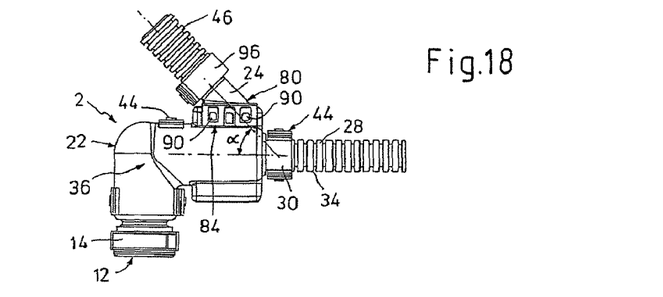
FIG. 18 shows a view as in FIG. 16, but with an alternative assembled state of the branch part.
Figure 19:
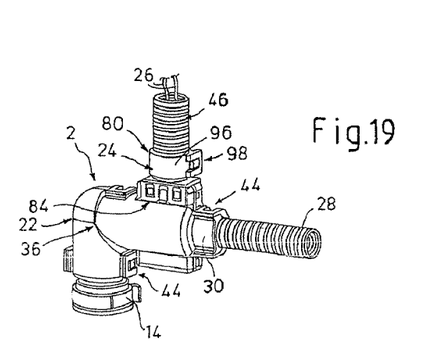
FIG. 19 shows a perspective view of an alternative embodiment of the line connector.
Figure 20:
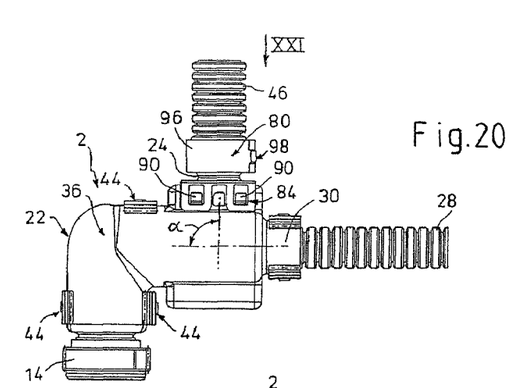
FIG. 20 shows a side view, which is enlarged in relation to FIG. 19, of the line connector.
Figure 21:
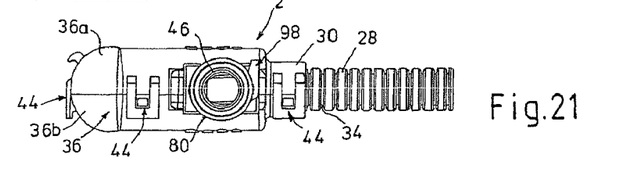
FIG. 21 shows a view in the arrow direction XXI according to FIG. 20.
Figure 22:
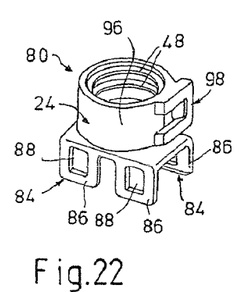
FIG. 22 shows a perspective view of a first embodiment of the branch part for the embodiment of the line connector according to FIGS. 19 to 21.
Figure 23:
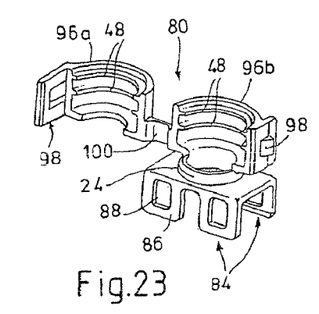
FIG. 23 shows a perspective view of the branch part according to FIG. 22 in an open state of a holding section for a cable sheath.
Figure 24:
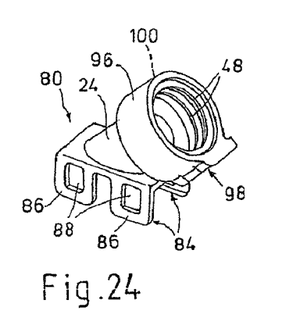
FIG. 24 shows a perspective view of a second embodiment of the branch part for the embodiment of the line connector according to FIGS. 16 to 18.
Figure 25:
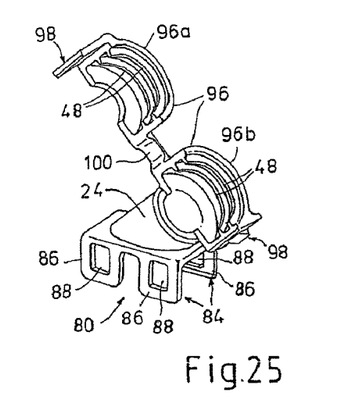
FIG. 25 shows an illustration of the branch part according to FIG. 24 in a state similar to FIG. 23.

In the case of an acutely or obtusely angled or even parallel branch, the separate design of the branch part 80 is particularly advantageous because, according to firstly FIG. 16 and secondly FIG. 18, a connection of the branch part 80 to the connector housing 36 is selectively possible in at least two different alignments. In this way, the direction of the branch 24 can be varied. This correspondingly also applies to the design according to FIG. 28.

Finally, it is mentioned again that the invention also relates to the entire assembled media line 1, for example in a design according to FIG. 12 or 13. Here, at least one line connector 2 of a design according to the invention is used. The line connector 2 may have all the features already explained above.

The invention is not restricted to the illustrated and described exemplary embodiments but rather also encompasses all equivalent embodiments within the meaning of the invention. Furthermore, the invention has hitherto also not been restricted to the combination of features defined in the respective independent claim, but rather may also be defined by any desired other combination of certain features of all the individual features disclosed overall. This means that basically practically any individual feature of the respective independent claim may be omitted or replaced by at least one individual feature disclosed at some other point of the application. In this respect, the claims are to be understood merely as a first attempt at a wording for an invention.

The invention claimed is:

1. A line connector and media line, comprising:
   a fluid connector having at least one attachment section connected to a fluid line having corrugated sheathing located thereabout, the fluid connector having a transition section which adjoins the attachment section and has an inner fluid duct, an electrical heating element disposed about the fluid connector for heating the fluid connector,
   a casing surrounding the fluid connector in the region of the heating element and engaging the fluid connector at an end opposite of the attachment section, the casing also surrounding the attachment section and including a tubular projection extending beyond the attachment section, the tubular projection surrounding the sheathing located about the fluid line in a positive locking engagement with the sheathing, the casing further including portions defining a branch opening, a branch part including a branch containing electrical supply cables, the branch part being releasably connected to the casing over the branch opening and being selectively positioned in one of a plurality of different alignments with respect to the casing, the branch being one of acute, obtuse and parallel to the attachment section;
   wherein the heating element is configured to generate heat and is formed by at least one electrical conductor extending about the outer circumference of the fluid connector and surrounding at least part of the transition section in a helical fashion, wherein the at least one electrical conductor is electrically connected to the electrical supply cables for receiving a voltage and generating heat, wherein the casing encloses the electrical conductor.

2. The line connector and media line as claimed in claim 1 wherein the casing is composed of two housing shells which are substantially symmetrical in relation to a parting plane and which can be latched to one another by a latching member, the housing half shells being formed as one of separate molded parts or as a single-piece molded part and are connected to one another in a hinged fashion by means of at least one film hinge.

3. The line connector and media line as claimed in claim 1 wherein the branch is configured to hold an end region of a tubular cable sheath for the supply cables in a positively locking fashion.

4. The line connector and media line as claimed in claim 1 wherein the branch has an electrical connection element, in the form of a plug connection, for external supply cables, with the connection element being connected within the casing to the heating element of the fluid connector or to a fluid line heating means of an attached fluid line for heating the fluid line.

5. The line connector and media line as claimed in claim 1 wherein the electrical conductor runs in a helical fashion over the circumference of the fluid line.

6. The line connector and media line as claimed in claim 1 wherein the branch, with regard to its branch axis, encloses an angle (a) in the range from 20° to 160° with a fluid line attachment axis aligned approximately parallel to the attachment axis.

7. The line connector and media line according to claim 1, further comprising a second fluid connector and a second casing, the second fluid connector having a second attachment section connected to an opposing end of the fluid line, the second casing surrounding the attachment section, engaging an end of the second fluid connector opposite of the second attachment section and including a second tubular projection extending beyond the second attachment section, the second tubular projection surrounding the sheathing located about the fluid line in a positive locking engagement with the sheathing, electrical cables within the sheathing, in a free space between the fluid line and the sheathing, the electrical cables configured to connect connectors for external supply cables in the region of the branches of the line connector to one another.

8. The line connector and media line as claimed in claim 1, wherein an air volume is formed within the casing enclosing the fluid connector for heat insulation.

9. The line connector and media line as claimed in claim 1, wherein a remaining free space is provided within the casing, the remaining free space being at least partially filled with a casting compound.

10. The line connector and media line as claimed in claim 1, wherein the branch part is connected to the casing by a latched engagement.

* * * * *